(12) United States Patent
Childs et al.

(10) Patent No.: US 11,182,447 B2
(45) Date of Patent: Nov. 23, 2021

(54) CUSTOMIZED DISPLAY OF EMOTIONALLY FILTERED SOCIAL MEDIA CONTENT

(71) Applicant: International Business Machines Corporation, Armonk, NY (US)

(72) Inventors: Bryan Childs, Poughkeepisie, NY (US); Elizabeth Noel, Poughkeepsie, NY (US); Peter G. Spera, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

(21) Appl. No.: 16/181,629

(22) Filed: Nov. 6, 2018

(65) Prior Publication Data
US 2020/0143000 A1 May 7, 2020

(51) Int. Cl.
*G06F 7/00* (2006.01)
*G06F 16/9535* (2019.01)
(Continued)

(52) U.S. Cl.
CPC ........ *G06F 16/9535* (2019.01); *G06F 16/248* (2019.01); *G06F 16/24575* (2019.01); *G06F 16/287* (2019.01); *G06N 20/00* (2019.01)

(58) Field of Classification Search
CPC ............. G06F 16/958; G06F 16/24578; G06F 16/4393; G06F 15/7844; G06F 16/9577; G06F 16/9537; G06F 16/9535
See application file for complete search history.

(56) References Cited

U.S. PATENT DOCUMENTS

| 8,751,430 B2 | 6/2014 | Willcock |
|---|---|---|
| 8,762,312 B1 | 6/2014 | Newstadt et al. |

(Continued)

FOREIGN PATENT DOCUMENTS

| WO | WO2015/164951 | * | 11/2015 |
|---|---|---|---|
| WO | WO2019108810 | * | 6/2019 |

OTHER PUBLICATIONS

Costa et al.; "Emotion-Based Recommender System for Overcoming the Problem of Information Overload", PAAMS'13, University of Coimbra, Portugal, May 2013, pp. 178-189.

(Continued)

*Primary Examiner* — Daniel A Kuddus
(74) *Attorney, Agent, or Firm* — Cantor Colburn LLP; Teddi Maranzano

(57) ABSTRACT

Methods, systems and computer program products for providing a customized display of social media content that is automatically filtered based on emotional content are provided. Aspects include receiving a plurality of social media posts that have been published for display by a social media service. Aspects also include receiving an emotional profile including social media post filtering preferences that are based on emotional content of social media posts. In response to performing an emotional content analysis of each of the plurality of social media posts, aspects include identifying a set of emotionally acceptable social media posts and a set of emotionally unacceptable social media. Aspects also include causing the set of emotionally acceptable social media posts to be displayed in a primary news feed window of the social media service in association with an account of the user of the social media service.

14 Claims, 10 Drawing Sheets

(51) Int. Cl.
  *G06N 20/00* (2019.01)
  *G06F 16/248* (2019.01)
  *G06F 16/28* (2019.01)
  *G06F 16/2457* (2019.01)

(56) References Cited

U.S. PATENT DOCUMENTS

| | | | |
|---|---|---|---|
| 9,253,138 | B2 | 2/2016 | Bates et al. |
| 9,299,115 | B2* | 3/2016 | Mahmud ............... G06F 16/955 |
| 9,342,851 | B2 | 5/2016 | Musil |
| 9,712,587 | B1* | 7/2017 | Alfishawi .............. A61B 5/165 |
| 9,875,244 | B1 | 1/2018 | Kuznetsov |
| 9,930,136 | B2 | 3/2018 | Bastide et al. |
| 2009/0125814 | A1* | 5/2009 | Willcock ........... G06Q 30/0203 715/738 |
| 2014/0244658 | A1* | 8/2014 | Mahmud ........... G06F 16/24578 707/748 |
| 2015/0066950 | A1 | 3/2015 | Tobe et al. |
| 2015/0112753 | A1 | 4/2015 | Suvarna |
| 2015/0296239 | A1* | 10/2015 | Burger ............. H04N 21/44236 725/12 |
| 2016/0072903 | A1* | 3/2016 | Chakra ................. G06F 16/337 704/9 |
| 2017/0030726 | A1* | 2/2017 | French ............... G01C 21/3461 |
| 2017/0243120 | A1 | 8/2017 | Doan et al. |
| 2017/0364797 | A1* | 12/2017 | Pal .......................... G06F 40/20 |
| 2018/0005279 | A1* | 1/2018 | Battaglini .......... G06Q 30/0275 |
| 2018/0018569 | A1 | 1/2018 | Roitman et al. |
| 2018/0108025 | A1 | 4/2018 | Agarwal et al. |
| 2018/0173713 | A1* | 6/2018 | Lawbaugh ............ G06F 16/958 |
| 2018/0232641 | A1* | 8/2018 | Bostick ..................... G06N 5/04 |
| 2018/0239873 | A1* | 8/2018 | Eda ................... G06F 16/24578 |
| 2018/0268439 | A1* | 9/2018 | Avegliano .......... G06Q 30/0261 |
| 2019/0379936 | A1* | 12/2019 | Vinson ............... H04N 21/4788 |
| 2020/0257742 | A1* | 8/2020 | Chan ..................... G06F 3/0481 |
| 2021/0042366 | A1* | 2/2021 | Hicklin ................. G06N 20/00 |

OTHER PUBLICATIONS

Shanka et al.; "The Prefitering Techniques in Emotion Based . . . User Reviews", Applied Computational Intelligence and Software Computing, vol. 4, Oct. 2017, pp. 1-10.

Mohammad et al.; "Using Hashtags To Capture Fine Emotion Categories From Tweets", Computational Intelligence, vol. 31, Issue 1, May 2015, pp. 301-326.

Pearl et al.; "C'mon—You Should Read This: Automatic Identification of Tone From Language Text", International Journal IJCL, vol. 4, Issue 1, Aug. 30, 2013, pp. 12-30.

\* cited by examiner

CUSTOMIZED DISPLAY OF EMOTIONALLY FILTERED SOCIAL MEDIA CONTENT

BACKGROUND

The present invention generally relates to the presentation of social media content, and more specifically, to providing a customized display of social media content that is automatically filtered based on emotional content.

Social media services that allow a user to form social networks with friends, family, colleagues, strangers, organizations, and other contacts commonly provide the contacts with the capability of posting content that is viewable by the user via for example, a website or a mobile application. Content that is posted by a user's contacts (or in public forums, strangers) may be presented to the user in a chronologically arranged "news feed" of social media posts. Because a user has no control over what content is published by other users, a user may often be subjected to viewing social media content that the user finds upsetting or objectionable. For example, a user may be targeted with cyberbullying, trolling, or other negative attention. In other cases, a user may simply experience a negative reaction to viewing negative posts, such as posts that may result from a highly-public, highly-contested political campaign. To avoid encountering such negative posts, users may resort to avoiding the social media platform for a long time or to blocking or (or "defriending") users who may post negative content, which may, unfortunately, cause the user to otherwise miss out on significant positive content.

SUMMARY

Embodiments of the present invention are directed to a computer-implemented method for providing a customized display of social media content that is automatically filtered based on emotional content. A non-limiting example of the computer-implemented method includes receiving a plurality of social media posts that have been published for display by a social media service. The method also includes receiving an emotional profile associated with a user of the social media service. The emotional profile includes social media post filtering preferences that are based on the emotional content of social media posts. In response to performing an emotional content analysis of each of the plurality of social media posts, the method includes identifying, based on the emotional profile, a set of emotionally acceptable social media posts of the plurality of social media posts and a set of emotionally unacceptable social media posts of the plurality of social media posts. The method also includes causing the set of emotionally acceptable social media posts to be displayed in a primary news feed window of the social media service in association with an account of the user of the social media service.

Embodiments of the present invention are directed to a system for providing a customized display of social media content that is automatically filtered based on emotional content. The system includes a memory having computer readable computer instructions, and a processor for executing the computer readable instructions. The computer readable instructions include instructions for receiving a plurality of social media posts that have been published for display by a social media service. The computer readable instructions also include instructions for receiving an emotional profile associated with a user of the social media service. The emotional profile includes social media post filtering preferences that are based on the emotional content of social media posts. In response to performing an emotional content analysis of each of the plurality of social media posts, the computer readable instructions include instructions for identifying, based on the emotional profile, a set of emotionally acceptable social media posts of the plurality of social media posts and a set of emotionally unacceptable social media posts of the plurality of social media posts. The computer readable instructions also include instructions for causing the set of emotionally acceptable social media posts to be displayed in a primary news feed window of the social media service in association with an account of the user of the social media service.

Embodiments of the invention are directed to a computer program product for providing a customized display of social media content that is automatically filtered based on emotional content, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a plurality of social media posts that have been published for display by a social media service. The method also includes receiving an emotional profile associated with a user of the social media service. The emotional profile includes social media post filtering preferences that are based on the emotional content of social media posts. In response to performing an emotional content analysis of each of the plurality of social media posts, the method includes identifying, based on the emotional profile, a set of emotionally acceptable social media posts of the plurality of social media posts and a set of emotionally unacceptable social media posts of the plurality of social media posts. The method also includes causing the set of emotionally acceptable social media posts to be displayed in a primary news feed window of the social media service in association with an account of the user of the social media service.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
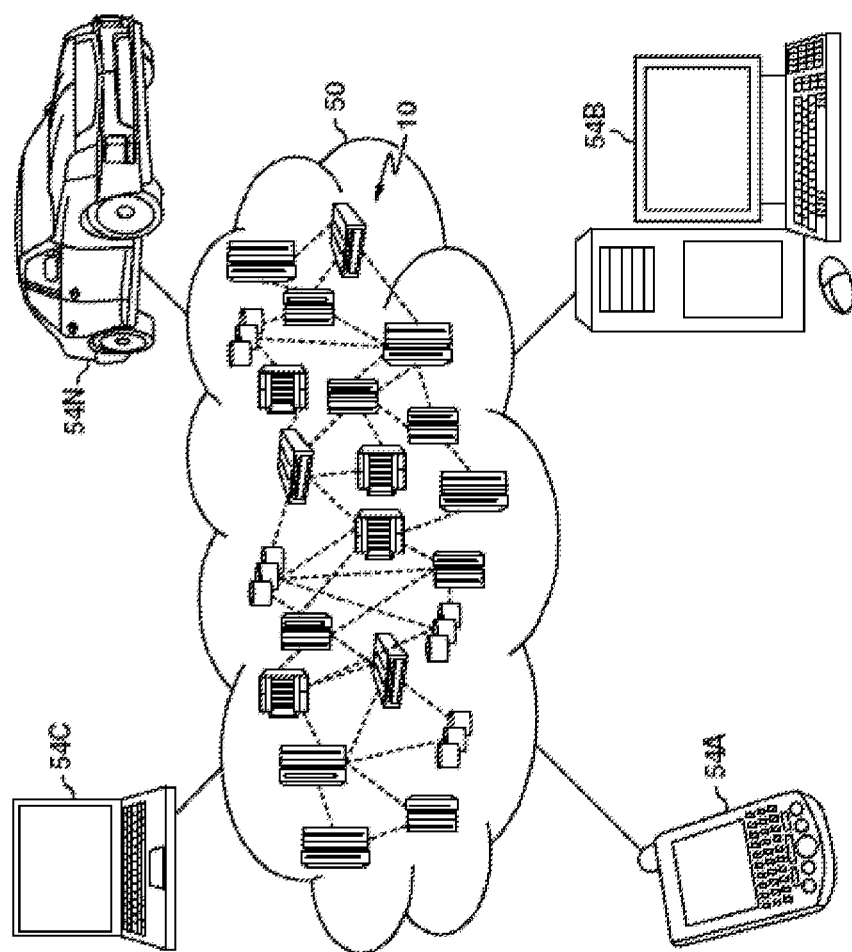
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
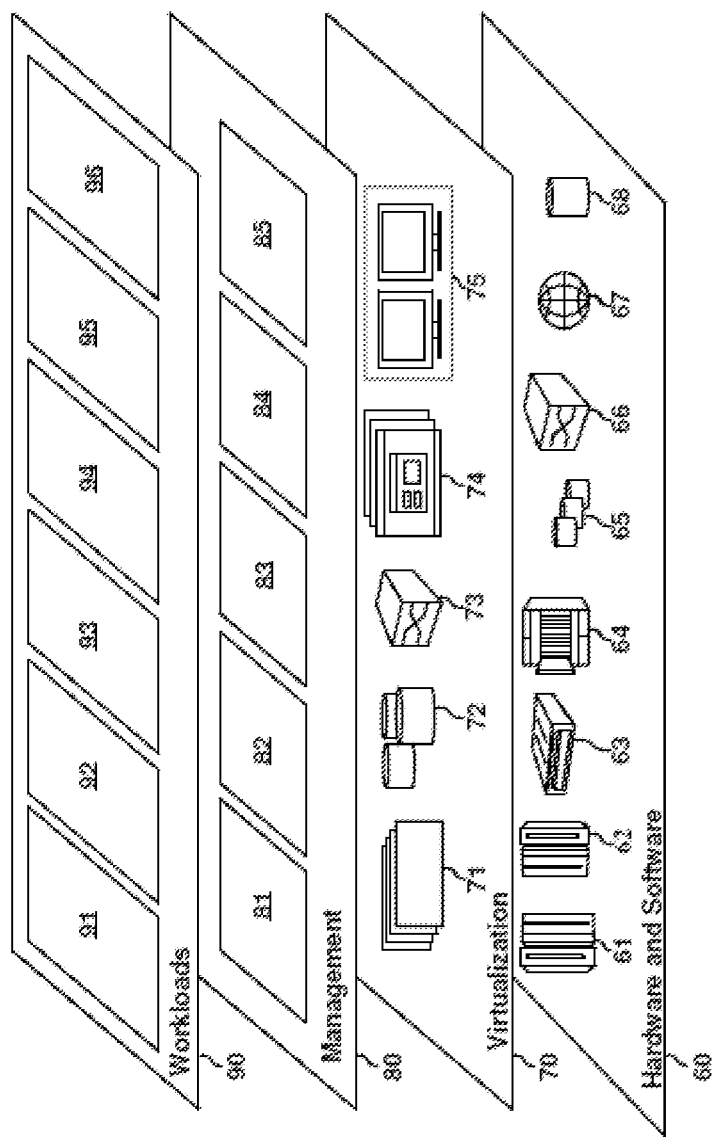
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a customized display of social media content that is automatically filtered based on emotional content 96.

Figure 3:
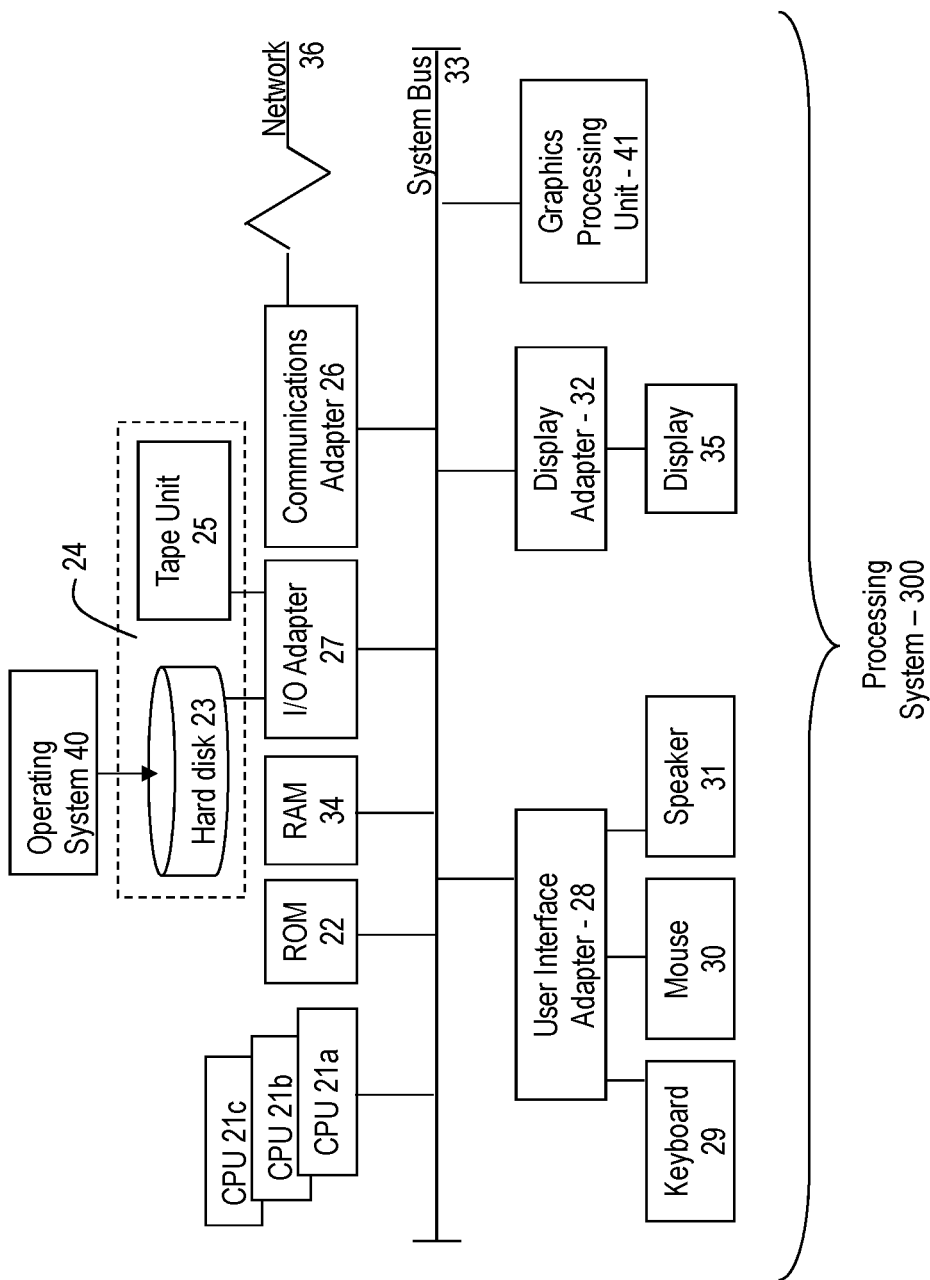
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing a customized display of social media content that is automatically filtered based on emotional content is provided. In exemplary embodiments, the system may perform an emotional content analysis on a plurality of social media posts to identify emotionally acceptable and emotionally unacceptable social media posts (which may alternatively be referred to as, for example, "positive" and "negative" social media posts), based on an emotional profile associated with a user. In some embodiments, the system may filter out the emotionally unacceptable social media posts such that only the emotionally acceptable social media posts are displayed to the user in, for example, the user's primary social media news feed or on a public comment forum. The emotionally unacceptable social media posts may be considered to be "emotional spam" that a user may otherwise view if desired, similar to a spam folder in an email system. In some embodiments, the emotional spam may be displayed in a less prominent or secondary news feed or forum window. Further, in some embodiments, the system may classify each social media post as being a particular type of emotional spam and each type can be displayed in a secondary news feed. For example, in some embodiments, the system may display an "anger spam" feed, a "sadness spam" feed, and a "fear spam" feed, each as secondary news feeds. Such secondary news feeds may be smaller or less prominent than the primary news feed that contains the emotionally acceptable social media posts. In this way, the system may either hide or minimize emotionally or intellectually negative social media content from the user, while still providing the user with the option to seek out of or otherwise view such content if desired. According to some embodiments, a user may customize a display to either hide some or all emotionally unacceptable social media posts or display one or more secondary news feeds that correspond to one or more categories of emotional spam.

The classification of a social media post as being an emotionally unacceptable social media post may be automatically determined by the system by analyzing the content of the social media post in view of the emotional profile of the user. The emotional profile of the user represents the filtering preferences of the user that are based on the emotional content of the social media posts. For example, an emotional profile may specify that social media posts that are classified as angry or have an anger characteristic with an intensity above a specified threshold should be filtered out. Such classifications may be made using natural language processing techniques that can identify the emotional content and/or intensity of the emotional content of a social media post by analyzing the text of a social media post. The emotional profile can be stored by the system and updated in response to user inputs (e.g., adjustments to thresholds) or automatic updates performed by the system as described herein. According to some embodiments, the social media filtering preferences of the emotional profile of a user may be based on user inputs, training a model, real-time observations of a user, other machine learning techniques, or some combination of such techniques. For example, the system may use machine learning techniques to study how long a user views particular posts or which posts a user hides to determine appropriate filtering preferences. In some embodiments, the system may automatically adjust the preferences based on a user's current emotional state, as determined by, for example observing the user's facial expressions or performing voice analysis of the user to determine if the user is currently in a heightened emotional state. Thus, the system can provide a customized and dynamic presentation of social media posts that is designed to increase the user's enjoyment of the social media experience.

Figure 4:
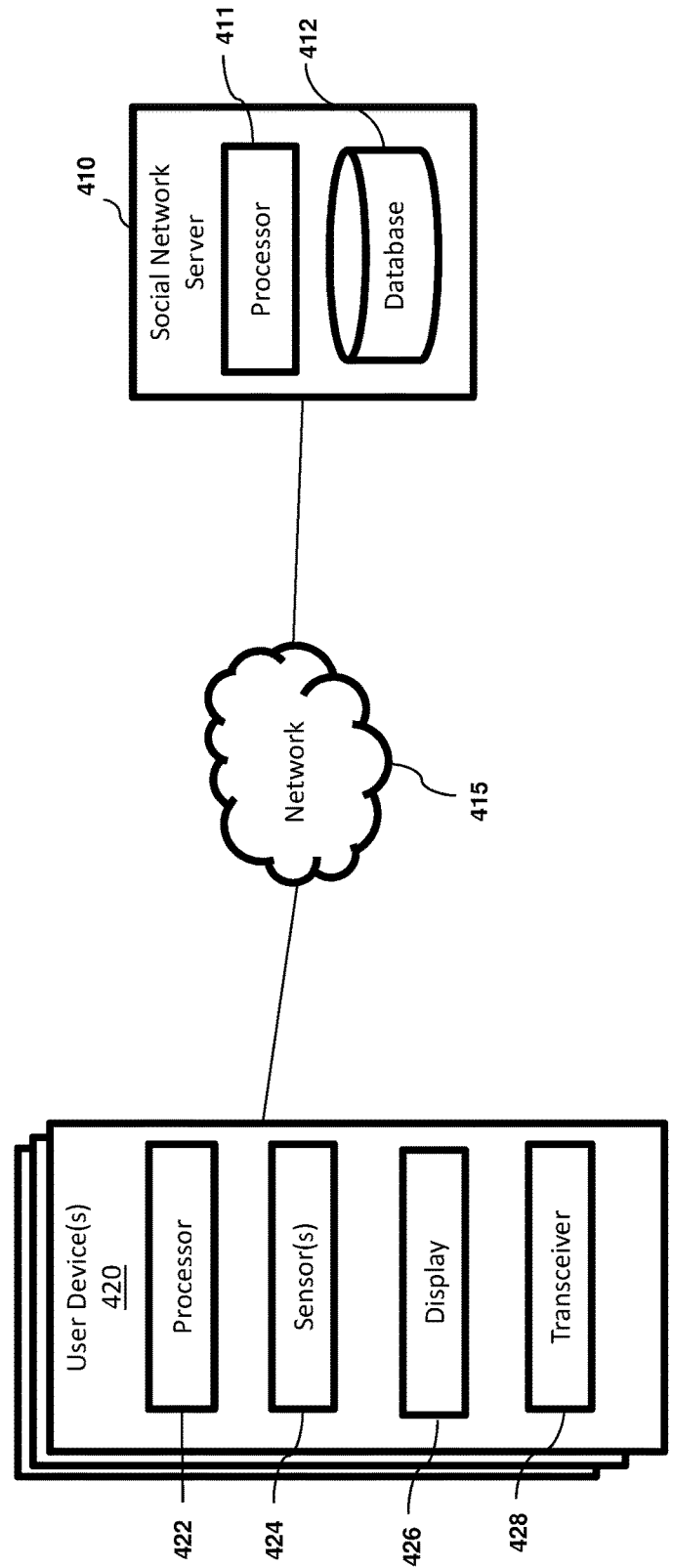
FIG. 4 depicts a system upon which providing a customized display of social media content that is automatically filtered based on emotional content may be implemented according to one or more embodiments of the present invention.

Turning now to FIG. 4, a system 400 for providing a customized display of social media content that is automatically filtered based on emotional content will now be described in accordance with an embodiment. The system 400 includes a social network server 410 in communication with user devices 420 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The user devices 420 are configured to allow a user to input, upload, and view social media posts and content through, for example, a website, a mobile application, or the like.

In exemplary embodiments, user devices 420 can include, but are not limited to, a smartphone, a wearable device such as a smartwatch, an augmented reality headset, a tablet, a computer system such as the one shown in FIG. 3, a television, or any other suitable electronic device. The user device 420 includes a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. Display 426 is configured to display social media content, such as a news feed or website forum of one or more social media posts and/or comments. In some embodiments, display 426 can be a touchscreen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.).

In some embodiments, a social network server 410 can include a processor 411 and a database 412 or another storage element. The social network server 410 can store various social media data such as usernames, passwords, relationships between users, social media content submitted by users, and user account preferences such as emotional profiles associated with user accounts. According to some embodiments, the social networking server 410 can include software that is configured to analyze and/or characterize the emotional content of social media posts using natural language processing. For example, in some embodiments, the social network server 410 may include a sentiment analysis module for determining a sentiment of a social media post and a tonal analysis module for determining a tone of a social media post. According to some embodiments, a sentiment analysis can result in a binary classification (e.g., a sentiment may be classified as "good" or "bad"). In some embodiments, a sentiment analysis can result in a ternary classification (e.g., a sentiment may be classified as positive, negative, or neutral). In some embodiments, a tonal analysis can result in one or more intensity ratings (e.g., a range of very weak to very strong) that correspond to one or more tones, including for example but not limited to anger, fear, job, sadness, analytical, confident, tentative, and other such tones.

The sentiment analysis module may be provided by IBM® WATSON® Alchemy Language application program interface (API) or WATSON® Natural Language Understanding API. The above mentioned APIs are mentioned for exemplary purposes. Any applicable cognitive AI can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable. The word stemming and summation module.

As described further below, social network server 410 can be configured to classify social media posts based on the determined emotional and/or subject matter content of the social media post, and can customize the display of social media posts based on such classifications in view of the emotional profile of the user. In some embodiments, in addition to natural language processing, the social network server 410 may be configured to determine an emotional content of an image or video associated with a social media post using image recognition techniques. In some embodiments, a user's emotional profile may include geographical filters and social network server 410 can be configured to receive location data from user devices 420 to determine the location of one or more users and filter the social media posts displayed to a user based on the user's location. For example, a user may be overwhelmed by the number of sad or angry social media posts posted on a social media network from around the world, however, while not wanting to be bogged down with negative emotions, the user may nonetheless may want to remain aware of sad or angry social media content originating from their locality. Thus, in some embodiments, a user's emotional profile may include geographic thresholds that can be associated with one or more emotional content classifications. For example, an emotional profile may include instructions to relegate sad social media posts occurring outside of the user's city or beyond 10 miles from the user, to the "emotional spam" category while instructing the system to display sad social media posts from within the specified area on the user's primary news feed 610. In other embodiments, the system 400 may utilize machine learning techniques to automatically determine location-based filtering thresholds based on the user's past behavior. For example, if a user repeatedly hides, minimizes, quickly skims or provides another indication of disinterest in sad social media posts from outside the user's location, the system may automatically determine the user is not interested in seeing sad social media posts from remote locations. In some embodiments, the location of a social media post can be determined from, for example, GPS data associated with a user device 420 responsible for creating or posting the social media post, or may be determined by performing natural language processing on the text of the social media post.

Figure 5:
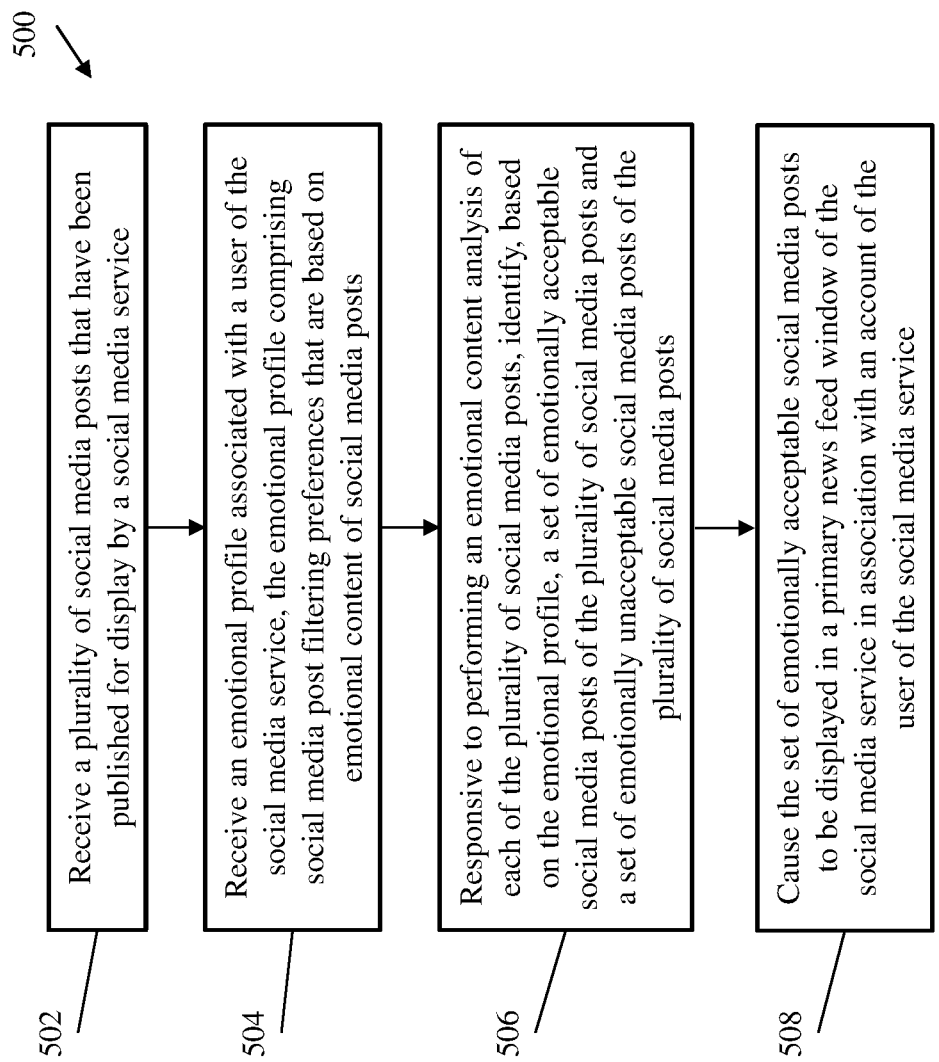
FIG. 5 depicts a flow diagram of a method for providing a customized display of social media content that is automatically filtered based on emotional content according to one or more embodiments of the invention.

Turning now to FIG. 5, a flow diagram of a method 500 for providing a customized display of social media content that is automatically filtered based on emotional content in accordance with an embodiment is shown. In one or more embodiments of the present invention, the method 500 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

Figure 6A:
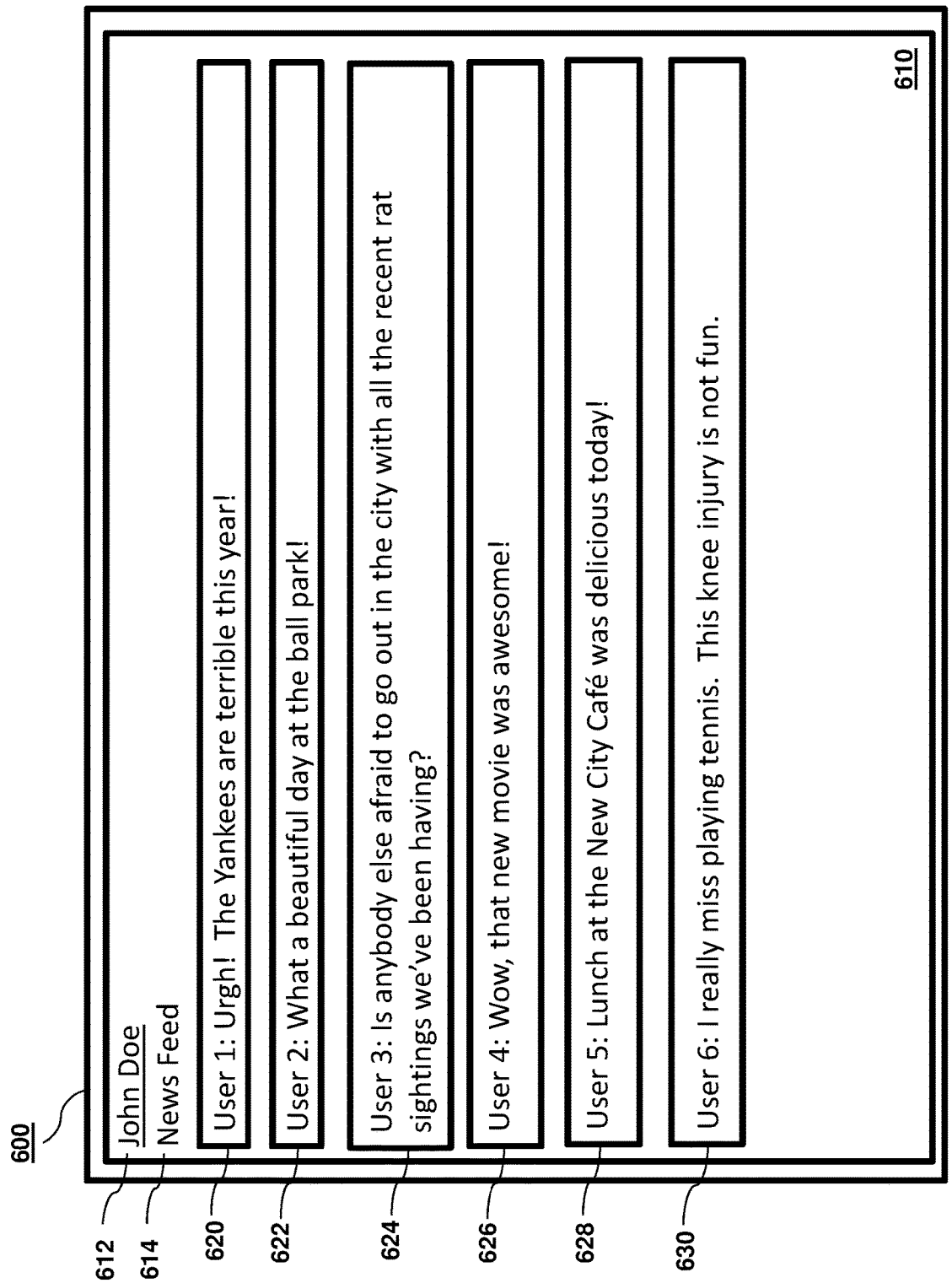
FIGS. 6A-6E depict example social media post display windows of a system of providing a customized display of social media content that is automatically filtered based on emotional content according to one or more embodiments of the invention.

The method 500 begins at block 502 and includes receiving (e.g., by social network server 410) a plurality of social media posts that have been published for display by a social media service. According to some embodiments, a social media post can include text, one or more images, videos and/or links to websites. A social media post may also refer to a comment made by a user on other social media post. FIG. 6A shows an example of a social media post display window 600 that includes a primary news feed window 610 for displaying one or more social media posts. A social media post display window can be configured to be displayed by a display 426 of a user device 420, such as a computer screen, a TV, a smartphone display, or the like. In some embodiments, a primary news feed window 610 can be configured to display a sequence of social media posts for example, in order of when the social media post was uploaded or published for viewing. As will be understood by those of skill in the art, the contents of a news feed 614 may be unique to the user account 612 associated with the primary news feed window 610, based on, for example, the contacts or friends associated with the user account 612 that are creating the social media content. For example, a primary news feed window 610 may be configured to only display social media content generated by friends or connections of the user account 612. While this description is generally directed to a new feed window, it should be understood that it may also be applicable to social media posts made on a public forum, such as for example, open comments made on an online news article that can be viewed or commented upon by anyone. As shown in FIG. 6A, the news feed window may be configured to display social media posts 620, 622, 624, 626, 628, 630 from a plurality of users.

As shown at block 504, the method includes receiving an emotional profile associated with a user of the social media service. According to some embodiments, the emotional profile includes social media post filtering preferences that are based on emotional content of social media posts. In some embodiments, social media post filtering preferences can include one or more thresholds that can be used to determine whether a subject social media post is emotionally acceptable or unacceptable. For example, a particular user may have a high tolerance for sad social media posts and therefore the social media filtering preferences of that user may include a high threshold for sad social media posts, whereas it may include a much lower threshold for angry social media posts. According to some embodiments, the social media filtering preferences may include thresholds that correlate to a number of emotional classifications, such as anger, sadness, fear, joy, disgust, analytical, confident, tentative, or any other such suitable classification. It should be understood that these emotional classifications are merely exemplary and the system may use any number of different emotional classifications. A threshold can be represented as a numerical score, such as a percentage, or may be represented by descriptions such as "high tolerance," "very high tolerance" and the like. In some embodiments, a threshold can be represented as a user input on a scale (e.g., 1-100, a percentage), a number that can be incrementally changed higher or lower by manipulation of a virtual dial (e.g., a dial that can be turned to "+" or "−"), adjusting the position of a slider on a virtual bar that represents a range of values, or any other suitable representation. In some embodiments, the system 400 may present allow a user to set one or more thresholds by causing a user device 420 to display a user interface with input fields, dials, sliders, buttons, other types of user input features or some combination of the preceding to allow a user to set thresholds for one or more emotional classifications and/or tonal categories (e.g., anger, sadness, fear, joy, disgust, etc.). In some embodiments, the user interface may allow a user to input expiration times and/or dates for a tonal threshold to expire. For example, a user may input a low threshold for angry posts with a three day expiration duration, which may cause the system to more readily (i.e., based on the low threshold) filter out posts with a degree of angry emotional content for the subsequent three days, at which point the system may revert the threshold associated with anger back to a previously set value or to a default value. According to some embodiments, using machine learning techniques, the system may automatically or adaptively set or reset one or more emotional or tonal thresholds in response to, for example, the number of recent negative social media posts (i.e., filtered social media posts) having fallen or below a predetermined frequency threshold. For example, in some embodiments, if the frequency of negative social media posts that have been filtered by the system over a predetermined time period is less than, for example, one out of every five social media posts, the system may automatically change the thresholds associated with negative emotions (e.g., anger, sadness, fear, etc.) to allow more social media posts having a degree of a negative emotional content to be posted to a user's primary news feed. Conversely, in some embodiments, the system may automatically changes the thresholds associated with negative emotions to prevent more social media posts having a degree of negative emotional content to be posted to a user's primary news feed when the frequency of negative social media posts that have been filtered by the system over a predetermined time period is more than a threshold frequency amount to reduce the amount of negative posts that appear in the user's primary news feed. In this way, the system may automatically adapt the amount or percentage of negative social media posts that are prominently presented to a user.

In some embodiments, the social media post filtering preferences of the emotional profile can be determined based on user input preferences. For example, the system (e.g., social network server 410) may receive user inputs that specify different thresholds for different types of emotional classifications.

In some embodiments, the social media post filtering preferences of the emotional profile can be determined using machine learning techniques based on the past behavior of the user and/or behavior of other users considered to be in a similar demographic as the user (e.g., similar age, sex, location, education, etc.). For example, if a user routinely hides, ignores, or quickly skips past social media posts having a high level of angry emotional content, the system (e.g., social network server 410) can determine that the user has a low tolerance for social media posts that can be classified as angry. According to some embodiments, such machine learning techniques can incorporate one or more of: receiving user input instructions to hide a social media post, receiving user input instructions to classify an emotional content of a social media post, receiving user input confirmations and/or rejections of automatically determined emotional content classifications of social media posts, performing tonal analysis and/or sentiment analysis, using natural language processing, on one or more text responses to social media posts made by the user, and observing a duration of time that the user views a social media post in relation to an emotional content classification of the social media post. As will be understood by those of skill in the art, the system can test classifications of social media posts against the user's acceptance, rejections or re-classification of the social media post to learn the user's preferences. Further, if the user submits a comment on a social media post the system can use natural language processing to determine whether the user's view of the post is positive or negative. According to some embodiments, the system 400 can be configured to allow a user to selectively opt in or out of a machine learning feature such that if the user opts in, the system may use the machine learning techniques to automatically adjust the user's emotional profile and may use the user's behavior in defining the emotional profiles of other users. A user's demographic information (e.g., age, sex, location, education, etc.) may already be known by a social media service or may be obtained as a part of a machine learning opt-in process.

As shown at block 506, the method includes, in response to performing an emotional content analysis of each of the plurality of social media posts identifying, based on the emotional profile, a set of emotionally acceptable social media posts of the plurality of social media posts and a set of emotionally unacceptable social media posts of the plurality of social media posts.

According to some embodiments, performing an emotional content analysis can include determining a sentiment of text associated with social media post using natural language processing. In some embodiments, performing an emotional content analysis can include determining a tone of text associated with a social media post using natural language processing. In some embodiments, performing an emotional content analysis can include determining a subject matter of text associated with a social media post using natural language processing. In some embodiments, performing an emotional content analysis may include one or more of the techniques described herein. For example, the system may use such analyses to determine that a particular social media post is related to the subject of politics, has an angry tone and a negative sentiment. In the example shown in FIG. 6B, the system can determine that for example, the first social media post 620 has an angry emotional content, the second social media post 622 has a joyful emotional content, the third social media post 624 has a fearful emotional content, the fourth and fifth social media posts 626, 628 have a joyful emotional content, and the sixth social media post 630 has a sad emotional content. Based on the filtering preferences of the emotional profile of the user, the system (e.g., social network server 410) may determine that, for example, the first, third and sixth social media posts 620, 624, 630 make up a set of emotionally unacceptable social media posts because the user does not want to view angry, fearful or sad social media posts, and conversely the second, fourth and fifth social media posts 622, 626, 628 make up a set of emotionally acceptable social media posts.

Figure 6B:
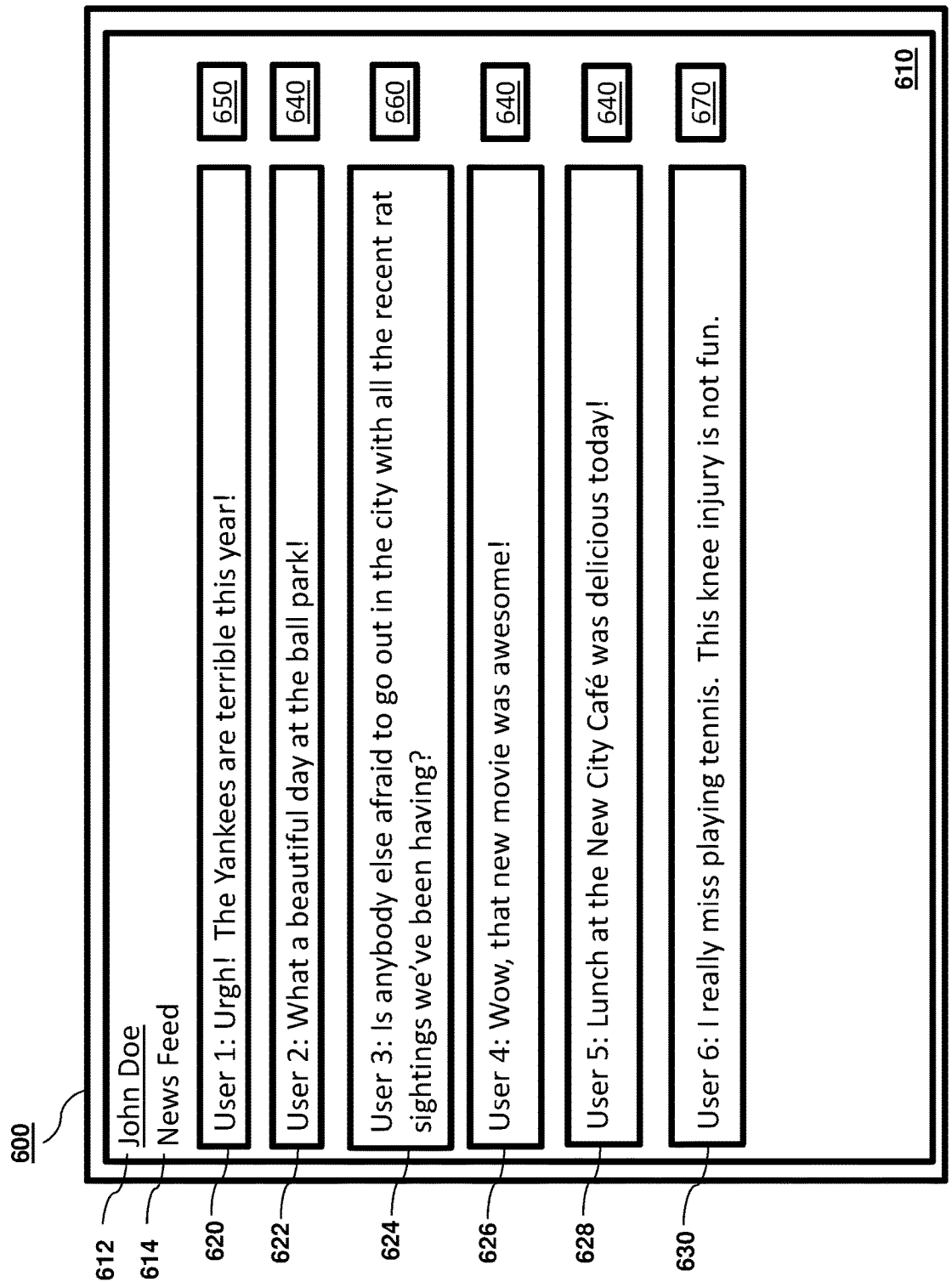
Figure 6C:
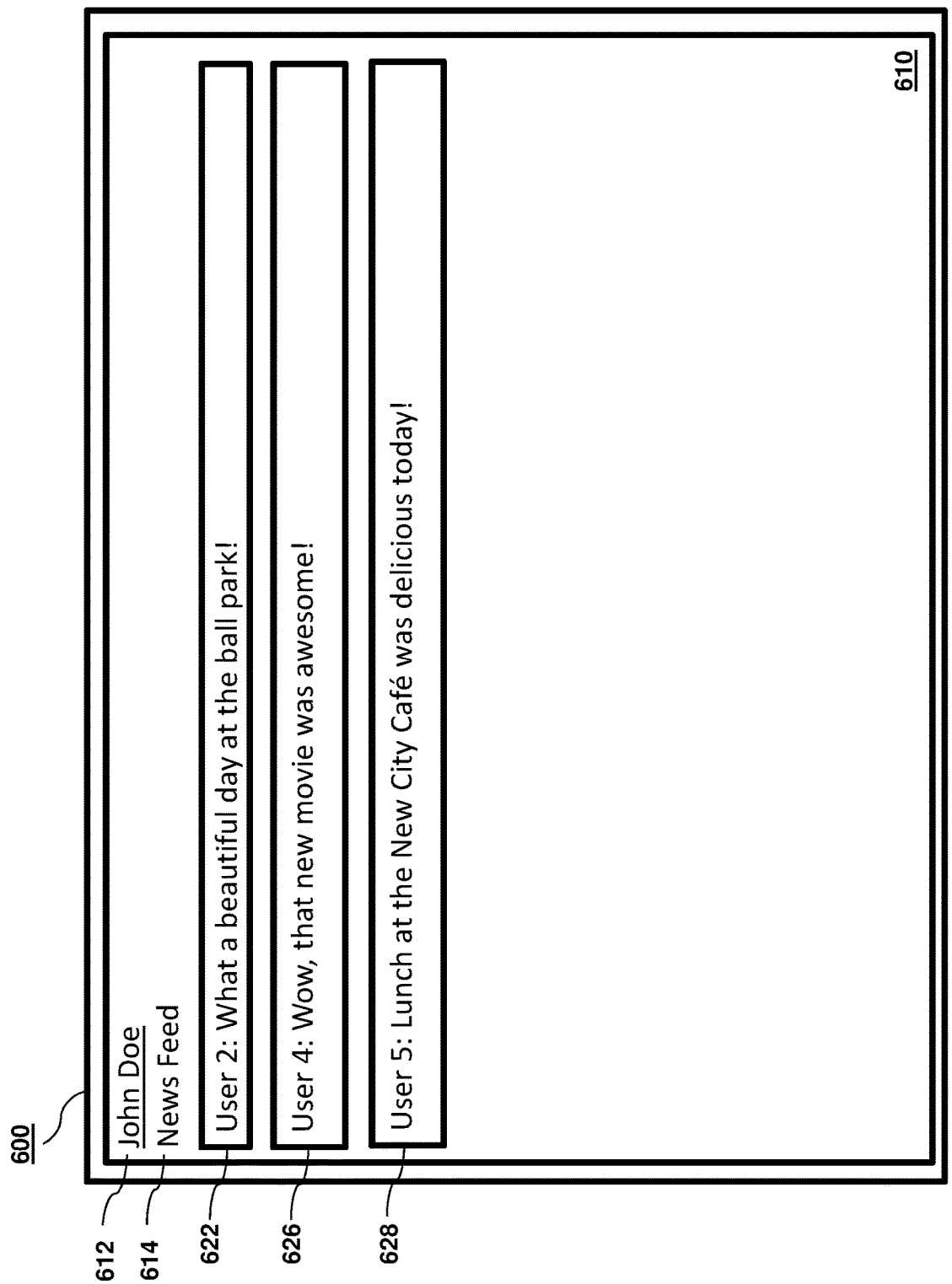

As shown in block 508, the method includes causing the set of emotionally acceptable social media posts to be displayed in a primary news feed window of the social media service in association with an account of the user of the social media service. In some embodiments, the method can include causing the set of emotionally unacceptable social media posts to be prevented from being displayed in the primary news feed window of the social media service in association with an account of the user of the social media service. For example, as shown in FIG. 6C, the system may automatically remove the first, third and sixth social media posts 620, 624, 630 from display in the primary news feed window 610, such that only second, fourth and fifth social media posts 622, 624, 628 are displayed in the primary news feed window 610. In this way, the system 400 can automatically configure the social media content that is displayed to the user in accordance with the user's emotional profile.

Figure 6D:
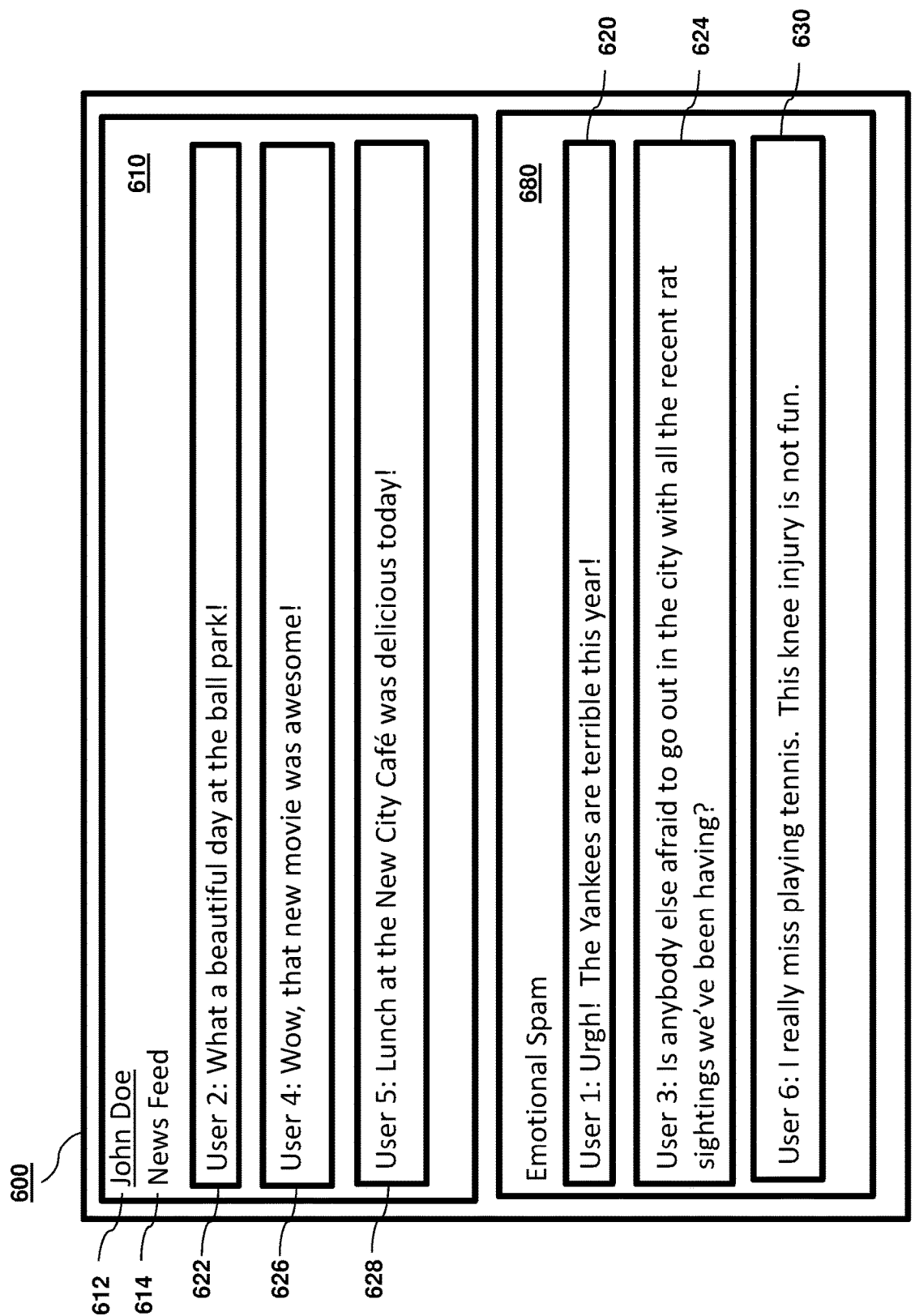

In some embodiments, the method includes causing the set of emotionally unacceptable posts to be displayed in a secondary news window of the social media service in association with the account of the user of the social media service. For example, as shown in FIG. 6D, the social media display window 600 may include a secondary new feed window 680 for displaying the "emotional spam" that was filtered out of the primary news feed window 610.

According to some embodiments method 500 can further include for each social media post of the set of emotionally unacceptable social media posts, determining, based on the emotional content analysis, an emotional classification of the social media post and causing the set of emotionally unacceptable social media posts to be displayed in the primary news feed window of the social media service in association with the account of the user of the social media service such that each social media post of the set of emotionally unacceptable social media posts is displayed in association with a visual indication of a respective associated emotional classification of the social media post.

According to some embodiments, the visual indication can include an icon associated with the social media post or a highlighted color of the social media post. For example, as shown in FIG. 6B, instead of preventing the emotionally unacceptable social media posts from being displayed in the primary news window, the system may associate a first icon 640 with the social media posts having a joyful emotional content, a second icon 650 with the social media posts having an angry emotional content, a third icon 660 with the social media posts having a fearful emotional content, and a fourth icon with the social media posts having a sad emotional content. Each icon can be a visual representation of the classification of the associated social media post, so that the user can quickly ascertain the emotional content of a given social media post before deciding to view the post in more detail. As will be appreciated, alternative visual representations of classifications of social media posts, such as color-coding, can also be used.

Figure 6E:
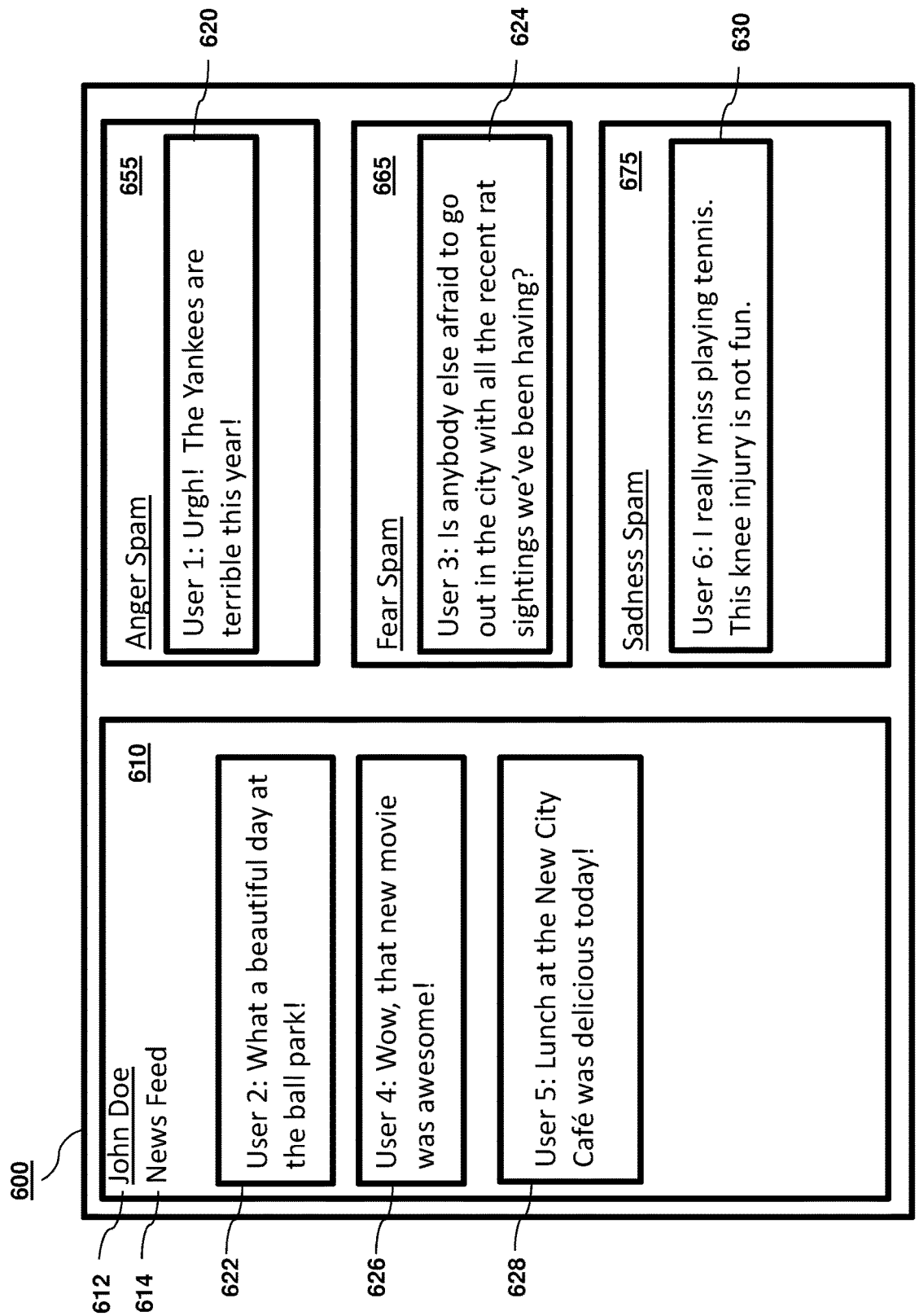

In some embodiments, the method can include for each social media post of the set of emotionally unacceptable social media posts, determining, based on the emotional content analysis, an emotional classification of the social media post, identifying at least a first group of social media posts of the set of emotionally unacceptable social media posts that are associated with a first emotional classification and a second group of social media posts of the set of emotionally unacceptable social media posts that are associated with a second emotional classification, and causing the first group of social media posts to be displayed in a first secondary news feed window of the social media service in association with the account of the user of the social media service and the second group of social media post to be displayed in a second secondary news feed window of the social media service in association with the account of the user of the social media service. In other words, in some embodiments, the system may create multiple secondary news feed windows to display "emotional spam" and each secondary window can be associated with a particular emotional content and/or subject matter. For example, as shown in FIG. 6E, the social media post display window 600 includes a first secondary news feed window 655 for displaying social media posts having an angry emotional content (e.g., first social media post 620), a second secondary news feed window 665 for displaying social media posts having a fearful emotional content (e.g., third social media post 624) and a third secondary news feed window 675 for displaying social media posts having a sad emotional content (e.g., sixth social media post 630). In some embodiments, user device 420 may include software that allows a user to configure the display of "emotional spam" between different views, such as removing the emotional spam from the primary news feed window 610 as shown in the example embodiment in FIG. 6B, displaying the emotional spam in the primary news feed window 610 with visual indications of the classifications of the emotional content of the posts as shown in the example embodiment in FIG. 6B, or displaying the emotional content in one or more secondary news feed windows as shown in the example embodiments in FIGS. 6D and 6E. In some embodiments, the system may allow a user to configure which classifications or combinations of classifications of emotional content the user would like to display in one or more secondary news feed windows (if any).

In some embodiments, method 500 can further include obtaining sensor data from a device associated with the user (e.g., user device 420), the sensor data comprising audio and/or visual data, determining a present emotional state of the user, and modifying the filtering preferences of the emotional profile associated with a user of the social media service based on the user's present emotional state. For example, if a user is viewing social media content on a desktop computer or a mobile phone equipped with a camera and/or a microphone, the system can be configured to obtain images and voice samples of the user in real time. According to some embodiments, determining a present emotional state of the user can be based on at least one of: determining a facial expression of the user based on image recognition performed on the visual data (e.g., images and video) and determining the a tone of the user based on voice analysis performed on the audio data (e.g., voice samples or other audio recordings). As will be understood by those having skill in the art, image recognition can be performed on one or more images of the user's face to determine the user's expression (e.g., smiling, crying, angry, etc.) to determine the user's current emotional state. Similarly, a user's voice may be analyzed for tone, pitch, volume, cadence, slurring, and the like to determine the user's current emotional state. Further, the system may utilize voice recognition and natural language processing techniques to determine the user's current emotional state based on words being spoken by the user. In some embodiments, modifying the filtering preferences of the emotional profile associated with a user of the social media service based on the present emotional state of the user can include lowering one or more thresholds for filtering social media posts based on emotional content in response to determining that the user is in a heightened emotional state. For example, if the system determines that the user is currently very angry, sad, distressed, or the like, the system may lower the thresholds for classifying a social media post as being emotionally unacceptable so that the user sees less potentially emotionally disturbing social media content. In some embodiments, modifying the filtering preferences of the emotional profile associated with a user of the social media service based on the present emotional state of the user can include raising one or more thresholds for filtering social media posts based on emotional content in response to determining that the user is in a relaxed emotional state. Thus, as will be appreciated, in some embodiments, the system 400 can dynamically alter the display of social media posts to the user based on the user's current emotional state to enhance the user's experience of the social media platform.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor of a social media server and from a social media service, a plurality of social media posts that have been published for display by a primary news feed window of a user account of the social media service;

receiving, by the processor of the social media server, an emotional profile associated with the user of the social media service, the emotional profile comprising social media post filtering preferences that are based on emotional content of social media posts;

obtaining, by the processor of the social media server, real time sensor data from a device associated with the user, the sensor data comprising at least one of real time audio and real time visual data;

determining, by the processor of the social media server, a present emotional state of the user based on at least one of:

determining, by the processor of the social media server and based on image recognition performed on the visual data, a facial expression of the user; and determining, by the processor of the social media server and based on natural language processing techniques performed on the audio data, a tone of the user; and modifying, by the processor of the social media server, the filtering preferences of the emotional profile associated with the user of the social media service based on the present emotional state;

responsive to performing an emotional content analysis of each of the plurality of social media posts, identifying, by the processor of the social media server and based on the emotional profile, a set of emotionally acceptable social media posts of the plurality of social media posts and a set of emotionally unacceptable social media posts of the plurality of social media posts, wherein whether a social media post is acceptable or unacceptable is based at least on machine learning analysis of interactions with social media from posts other users of the social media service having a demographic associated with the user;

transmitting, by the processor of the social media server, the set of emotionally acceptable social media posts of the plurality of social media posts and the set of emotionally unacceptable social media posts of the plurality of social media posts to the device associated with the user; and causing, by the processor of the social media server, the set of emotionally acceptable social media posts to be displayed in a primary news feed window of the social media service in association with an account of the user of the social media service, wherein the social media post filtering preferences of the emotional profile are determined based on user input preferences.

2. The computer-implemented method of claim 1, further comprising:

causing the set of emotionally unacceptable posts to be displayed in a secondary news window of the social media service in association with the account of the user of the social media service.

3. The computer-implemented method of claim 1, further comprising:

for each social media post of the set of emotionally unacceptable social media posts, determining, based on the emotional content analysis, an emotional classification of the social media post;

identifying at least a first group of social media posts of the set of emotionally unacceptable social media posts that are associated with a first emotional classification and a second group of social media posts of the set of emotionally unacceptable social media posts that are associated with a second emotional classification; and causing the first group of social media posts to be displayed in a first secondary news feed window of the social media service in association with the account of the user of the social media service and the second group of social media post to be displayed in a second secondary news feed window of the social media service in association with the account of the user of the social media service.

4. The computer-implemented method of claim 1, wherein performing an emotional content analysis comprises one or more of:

determining, using natural language processing, a sentiment of text associated with a social media post;

determining, using natural language processing, a tone of text associated with a social media post; and determining, using natural language processing, a subject matter of text associated with a social media post.

5. The computer-implemented method of claim 1, wherein social media post filtering preferences of the emotional profile are determined using machine learning techniques, the machine learning techniques incorporating one or more of:

receiving user input instructions to hide a social media post;

receiving user input instructions to classify an emotional content of a social media post;

receiving user input confirmations or rejections of automatically determined emotional content classifications of social media posts;

performing tonal analysis or sentiment analysis, using natural language processing, on one or more text responses to social media posts made by the user; and observing a duration of time that the user views a social media post in relation to an emotional content classification of the social media post.

6. The computer-implemented method of claim 5, wherein modifying the filtering preferences of the emotional profile associated with a user of the social media service based on the present emotional state comprises:

responsive to determining that the user is in a heightened emotional state, lowering one or more thresholds for filtering social media posts based on emotional content.

7. The computer-implemented method of claim 1, further comprising:

causing the set of emotionally unacceptable social media posts to be prevented from being displayed in the primary news feed window of the social media service in association with an account of the user of the social media service.

8. The computer-implemented method of claim 1, further comprising:

removing, from the primary news feed window; emotionally unacceptable social media posts that are being displayed based on the present emotional state of the user.

9. A system comprising:

a processor communicatively coupled to a memory, the processor configured to:

receive, from a social media service, a plurality of social media posts that have been published for display by a primary news feed window of a user account of the social media service;

receive an emotional profile associated with the user of the social media service, the emotional profile comprising social media post filtering preferences that are based on emotional content of social media posts;

obtain real time sensor data from a device associated with the user, the sensor data comprising at least one of real time audio and real time visual data;

determine a present emotional state of the user based on at least one of:

determine, based on image recognition performed on the visual data, a facial expression of the user; and determine, based on natural language processing techniques performed on the audio data, a tone of the user; and modify the filtering preferences of the emotional profile associated with the user of the social media service based on the present emotional state;

responsive to performing an emotional content analysis of each of the plurality of social media posts, identify, based on the emotional profile, a set of emotionally acceptable social media posts of the plurality of social media posts and a set of emotionally unacceptable social media posts of the plurality of social media posts, wherein whether a social media post is acceptable or unacceptable is based at least on machine learning analysis of interactions with social media posts from other users of the social media service having a demographic associated with the user;

transmit the set of emotionally acceptable social media posts of the plurality of social media posts and the set of emotionally unacceptable social media posts of the plurality of social media posts to the device associated with the user; and cause the set of emotionally acceptable social media posts to be displayed in a primary news feed window of the social media service in association with an account of the user of the social media service, wherein the social media post filtering preferences of the emotional profile are determined based on user input preferences.

10. The system of claim 9, the processor being further configured to:

cause the set of emotionally unacceptable social media posts to be prevented from being displayed in the primary news feed window of the social media service in association with an account of the user of the social media service.

11. The system of claim 9, the processor being further configured to:

remove, from the primary news feed window; emotionally unacceptable social media posts that are being displayed based on the present emotional state of the user.

12. A computer program product comprising a computer readable storage medium having program instructions embodied therewith the program instructions executable by a computer processor to cause the computer processor to perform a method comprising:

receiving, from a social media service, a plurality of social media posts that have been published for display by a primary news feed window of a user account of the social media service;

receiving an emotional profile associated with the user of the social media service, the emotional profile comprising social media post filtering preferences that are based on emotional content of social media posts;

obtaining real time sensor data from a device associated with the user, the sensor data comprising at least one of real time audio and real time visual data;

determining a present emotional state of the user based on at least one of:

determining, based on image recognition performed on the visual data, a facial expression of the user; and determining, based on natural language processing techniques performed on the audio data, a tone of the user; and modifying the filtering preferences of the emotional profile associated with the user of the social media service based on the present emotional state;

responsive to performing an emotional content analysis of each of the plurality of social media posts, identifying, based on the emotional profile, a set of emotionally acceptable social media posts of the plurality of social media posts and a set of emotionally unacceptable social media posts of the plurality of social media posts, wherein whether a social media post is acceptable or unacceptable is based at least on machine learning analysis of interactions with social media posts from other users of the social media service having a demographic associated with the user;

transmitting the set of emotionally acceptable social media posts of the plurality of social media posts and the set of emotionally unacceptable social media posts of the plurality of social media posts to the device associated with the user; and causing the set of emotionally acceptable social media posts to be displayed in a primary news feed window of the social media service in association with an account of the user of the social media service, wherein the social media post filtering preferences of the emotional profile are determined based on user input preferences.

13. The computer program product of claim 12, wherein the method further comprises:

for each social media post of the set of emotionally unacceptable social media posts, determining, based on the emotional content analysis, an emotional classification of the social media post;

identifying at least a first group of social media posts of the set of emotionally unacceptable social media posts that are associated with a first emotional classification and a second group of social media posts of the set of emotionally unacceptable social media posts that are associated with a second emotional classification; and causing the first group of social media posts to be displayed in a first secondary news feed window of the social media service in association with the account of the user of the social media service and the second group of social media post to be displayed in a second secondary news feed window of the social media service in association with the account of the user of the social media service.

14. The system of claim 13, the method further comprising:

removing, from the primary news feed window; emotionally unacceptable social media posts that are being displayed based on the present emotional state of the user.

* * * * *